Dec. 9, 1947. B. A. SWENNES 2,432,259
END GATE FOR AMPHIBIAN VEHICLES
Filed April 5, 1944 2 Sheets-Sheet 1
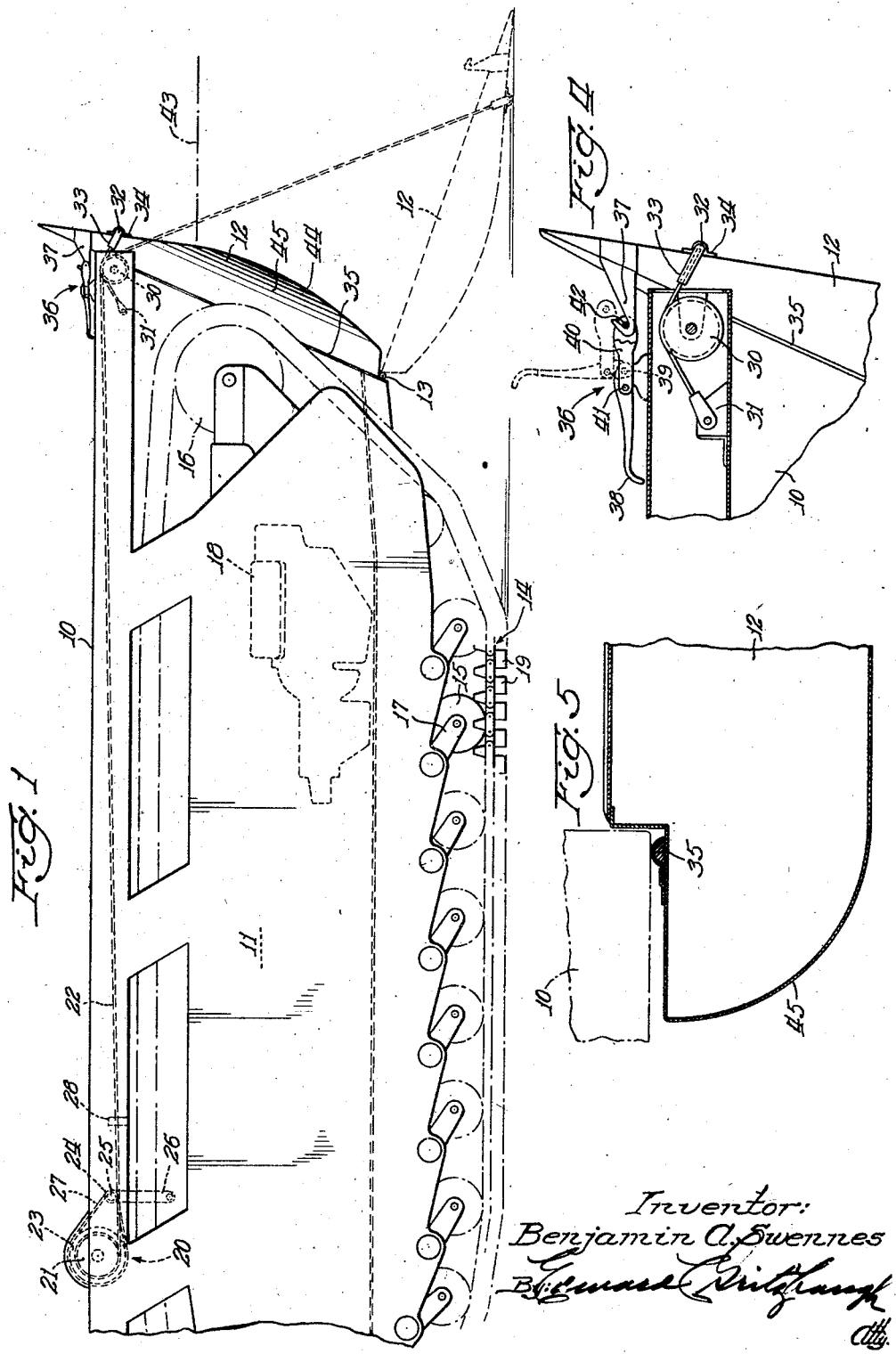
Inventor:
Benjamin A. Swennes

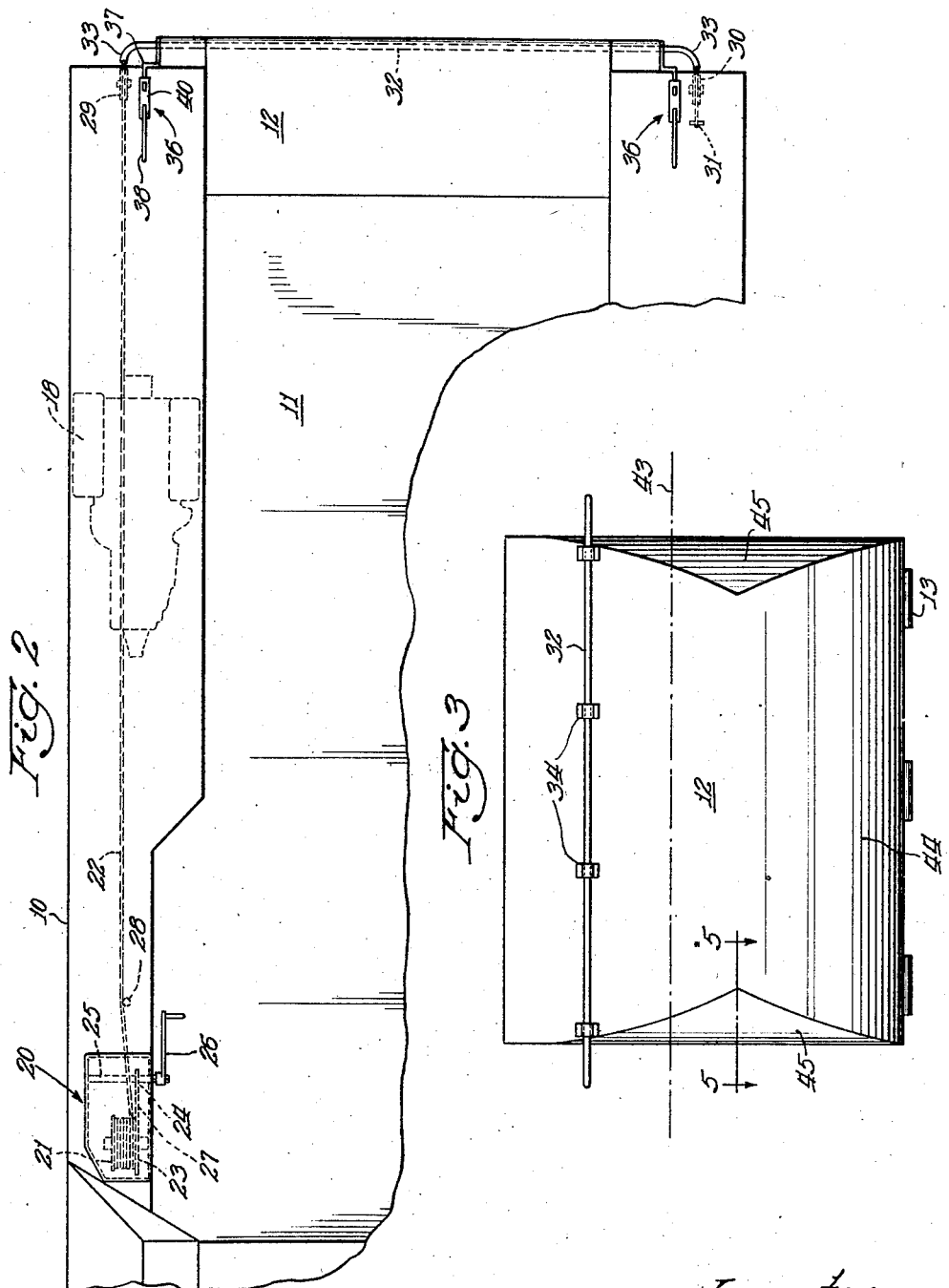

Patented Dec. 9, 1947

2,432,259

UNITED STATES PATENT OFFICE 2,432,259

ENDGATE FOR AMPHIBIAN VEHICLES

Benjamin A. Swennes, Rockford, Ill., assignor, by mesne assignments, to the United States of America, as represented by the Secretary of the Navy Application April 5, 1944, Serial No. 529,629

6 Claims. (Cl. 115—1)

My invention relates to motor vehicles and more particularly to motor vehicles adapted to travel either over land or through the water.

In my co-pending application, Serial No. 508,304, filed October 30, 1943, there is disclosed an amphibian vehicle having a cargo space therein and provided with an end gate whereby cargo may be loaded into and out of the cargo space when the vehicle is on land. The gate is hingedly mounted at its bottom edge to the body of the vehicle so that when open it may be used as a ramp. In an actual embodiment of the amphibian vehicle, the gate weighed between 600 and 700 pounds, and it was thus impracticable to close the gate manually.

It is an object of the present invention to provide an improved arrangement for closing the gate in such a vehicle which provides a mechanical advantage so that a single person may without difficulty close the gate. It is a further object to provide such an improved gate closing arrangement which comprises a windlass on one side which is effective to pull the gate upward into closed position from both sides thereof.

It was found with such an amphibian vehicle provided on its rear end with a gate, a substantial portion of which was submerged when the vehicle was in the water, that the gate caused a considerable drag on the vehicle when the vehicle traveled through the water in the forward direction, particularly when the gate had simply a plane outer surface. It is another object of my invention to streamline the gate and more particularly to provide an outer surface on the gate which is curved both longitudinally and transversely of the gate, so that the gate causes less drag on the vehicle when the vehicle is traveling through the water in the forward direction.

The invention consists of the novel constructions, arrangements and devices to be hereinafter described and claimed for carrying out the above stated objects and such other objects as will appear from the following description of a certain preferred embodiment illustrated in the accompanying drawing, wherein:

Fig. 1 is a partial side elevational view of an amphibian vehicle of the type disclosed in my aforesaid copending application;

Fig. 2 is a partial plan view of the amphibian vehicle;

Fig. 3 is an elevational view of the rear end of the vehicle;

Fig. 4 is a partial side elevational view on an enlarged scale of the upper part of the gate and the adjacent body structure of the vehicle; and Fig. 5 is a sectional view on an enlarged scale taken on line 5—5 of Fig. 3.

Like characters of reference designate like parts in the several views.

Referring now to the drawings, the illustrated vehicle comprises a water-tight vehicle body 10 arranged to have a cargo space 11 therein. A gate 12 is mounted on the rear end of the vehicle body by means of a horizontally extending hinge 13 at the bottom of the gate. The gate when open provides access into the cargo space 11 and may be used as a ramp for loading and unloading cargo. A pair of endless articulated tracks 14 are provided on opposite sides of the vehicle, and each of the tracks extends around and is held in looped configuration by means of a plurality of bogie wheels 15 on the bottom of the vehicle, an idler wheel 16 and other wheels (not shown). The wheels 15 are each preferably connected with the vehicle body 10 by means of a swinging and yielding mechanism 17 of any suitable construction which functions to absorb shocks imparted to the wheels 15. The tracks 14 are driven by motors 18 in the vehicle disposed adjacent opposite sides thereof, with any suitable power transmitting means being provided between the motors and the tracks. The tracks are provided with lugs or grousers 19 thereon which function when the vehicle is in the water to provide the necessary traction for driving the vehicle through the water, and the grousers of course provide increased traction between the tracks 14 and the ground. For a disclosure of various details of the amphibian vehicle as so far described, such as details of the shape of the grousers 19 and details of the transmission mechanism between the motors 18 and the tracks 14, my aforesaid copending application may be referred to.

Inasmuch as the gate 12 in an actual embodiment of the amphibian vehicle may weigh between 600 and 700 pounds, it is quite impracticable to close the gate manually. I have therefore provided improved mechanical means for performing this function which comprises a windlass or winch 20 disposed on one side of the vehicle and adjacent its front end (not shown). The winch comprises a rotatable drum 21 on which a metal cable 22 is adapted to be wound, a sprocket 23 connected with the drum, a sprocket 24 on a shaft 25 adapted to be turned by means of a hand crank 26, and a chain 27 for operatively connecting the sprockets 23 and 24. The winch operates so that when the crank 26 is turned, the drum 21 is rotated to either wind or unwind the cable 22.

The cable 22 extends from the windlass 20 around a guide 28 fixed with respect to the body 10, over a pulley 29 rotatably mounted on the body 10 adjacent the rear end of the vehicle, around the gate 12 and over a second pulley 30 at the other side of the gate and adjacent the rear end of the vehicle, and the cable 22 is anchored with respect to the body 10 after it leaves the pulley 30 as at 31. A metal tube 32 is provided on the outer surface of the gate 12, and the cable 22 extends through this tube. The tube 32 at its ends has portions 33 which are bent through substantially right angles so as to extend substantially longitudinally of the vehicle and in line with the pulleys 29 and 30. The tube 32 is fastened with respect to the gate 12 by means of journal blocks 34 which are fixed to the gate and extend around the tube and which allow the tube to rotate with respect to the gate.

When it is desired to lower the gate 12 for either loading or unloading cargo, the crank handle 26 is turned in the proper direction to cause the drum 21 to pay out cable 22. The cable travels over the pulley 29 and through the tubing 32 so that the gate swings downwardly to its dotted line position as shown in Fig. 1. It will be noted that the tube 32, due to its curved portions 33, turns in the journal blocks 34 with respect to the gate, as the direction at which the cable approaches the gate from the pulleys 29 and 30 changes as the gate descends. The pulley 30 does not actually turn; however, this pulley advantageously provides the same connection with the vehicle body 10 as is provided for the cable 22 by the pulley 29. When it is desired to bring the gate 12 back to its closed position, the crank handle 26 is turned in the opposite direction to wind the cable 22 on the drum 21, and the cable passes over the pulley 29 and through the tube 32 to raise the gate. In view of the fact that both the tube 32 and the cable 22 are metal, there is an insubstantial amount of friction between the cable and the tube, so that the gate may be raised simply by taking in the cable 22 at one side of the gate instead of at both sides.

The gate 12 is made water-tight with respect to the body 10 by means of a sealing strip 35 of rubber-like material which extends around and is fixed to the gate. The strip 35, when the gate is closed, is in contact with the surrounding portions of the body 10 to seal the gate with respect to the body. Auxiliary locking mechanisms 36 are preferably provided on each side for holding the gate 12 tightly closed. These mechanisms each comprises a hook 37 on a side of the gate, a lever 38 rotatably connected with the body 10 as at 39, and a link 40 pivotally connected with the lever 38 as at 41 and having a hook portion 42 adapted to engage with a hook 37. The hooks 37 and 42 may be engaged when the lever 38 is in an upright position as shown in dotted lines in Fig. 4, and the gate is tightly closed when the levers 38 of the mechanisms 36 on both sides are moved to their full line positions, as will be apparent from an inspection of the constructions.

When the vehicle is in the water, the water line is approximately at the height indicated by lines 43 in Figs. 1 and 3, and a substantial portion of the gate 12 is submerged. In order to minimize the drag by the gate on the vehicle when the vehicle is traveling in the forward direction through the water, the outer surface of the gate has been curved longitudinally of the gate as at 44 (see Fig. 1), and the gate has also been curved on its outer surface transversely of the gate as at 45 (see Fig. 5). The provision of these curved surfaces on the outside of the gate streamlines the gate, and a higher speed is obtainable with the vehicle than could be obtained if the gate had simply a plane outer surface.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a vehicle, the combination of a vehicle body having a space therein for receiving a load, an end gate hingedly mounted on said vehicle body and providing access into the load space when open, and means for closing said gate and including a metal cable extending around the gate from one side to the other thereof, a metal tube on the outer side of said gate for receiving the cable and allowing the cable to readily pass therethrough, said tube having end portions bent around to extend longitudinally of the vehicle and the tube being rotatably mounted with respect to the end gate, means for anchoring said cable at one side of said gate to said vehicle body, and a windlass in said vehicle body connected with said cable from the other side of said gate for decreasing the length of cable from said anchoring means to the windlass and for thereby closing the gate, said tube being rotated with respect to the gate by the cable passing through the bent portions of the tube as the gate is raised or lowered.

2. In a vehicle, the combination of a vehicle body having a space therein for receiving a load, a gate hingedly mounted on one end of said vehicle body and providing access into the load space when open, and means for closing said gate and including a metal cable extending around the gate from one side to the other thereof, a metal tube on the gate for receiving said cable and adapted to allow ready movement of the cable therethrough, said tube being rotatably mounted on the gate and being bent on each end thereof to extend substantially longitudinally of the vehicle, means for anchoring said cable at one side of said gate adjacent said one end of the vehicle body, a pulley mounted on said body at the other side of said gate adjacent said one end of the body and receiving thereover said cable, and a windlass in said vehicle body adjacent the other end thereof and connected with said cable from said pulley for decreasing the length of cable from said anchoring means to the windlass and for thereby closing said gate, said tube rotating with respect to said end gate when the gate is raised or lowered due to the cable passing through the bent end portions of the tube.

3. In an amphibian vehicle, the combination of a water-tight vehicle body having a cargo space therein, means for propelling the vehicle either over land or through the water, and an end gate on said body for providing access from an end of the vehicle to said cargo space when the vehicle is on land, said end gate when closed being watertight with respect to the vehicle body and having a substantial portion thereof submerged when the vehicle is in the water, the outer surface of said end gate being curved both longitudinally and transversely thereof to render the gate streamlined and minimize the drag by the gate on the vehicle when the vehicle is traveling through the water.

4. In an amphibian vehicle, the combination of a water-tight vehicle body having a cargo space therein, a gate on the rear end of said vehicle for providing access from said end of the vehicle to the cargo space when the vehicle is on land, said gate being hingedly connected with the vehicle body to swing downwardly whereby the gate may be used as a ramp for loading or unloading the vehicle, and means for propelling the vehicle forwardly through the water or over land, said end gate when closed being water-tight with respect to the vehicle body and having a substantial portion thereof submerged when the vehicle is in the water, the outer surface of said end gate being curved both longitudinally and transversely thereof to render the gate streamlined and minimize the drag by the gate on the vehicle when the vehicle is traveling through the water in the forward direction.

5. In an amphibian vehicle, the combination of a water-tight vehicle body having a cargo space therein, a pair of tracks on opposite sides of the vehicle adapted to propel the vehicle either over land or through the water, means including a motor in the vehicle for driving the tracks, and an end gate mounted on the rear end of said body for providing access to said cargo space when the vehicle is on land and being hingedly mounted on said body at the bottom of the gate whereby to swing downwardly so that the gate may be used as a ramp, said gate when closed being water-tight with respect to the vehicle body and having a substantial portion thereof submerged when the vehicle is in the water, the outer surface of said gate being curved both longitudinally and transversely thereof to render the gate streamlined and minimize the drag by the gate on the vehicle when the vehicle is traveling through the water in the forward direction.

6. In an amphibian vehicle, the combination of a water-tight vehicle body having a cargo space therein, means for propelling the vehicle either over land or through the water, and an end gate on said body for providing access from an end of the vehicle to said cargo space when the vehicle is on land, said end gate when closed being water-tight with respect to the vehicle body and having a substantial portion thereof submerged when the vehicle is in the water, the outer surface of said end gate being curved to render the gate streamlined and to minimize the drag by the gate on the vehicle when the vehicle is traveling through the water.

BENJAMIN A. SWENNES.

REFERENCES CITED

The following references are of record in the file of this patent:

UNITED STATES PATENTS

| Number | Name | Date |
|---|---|---|
| 558,472 | Bering | Apr. 21, 1896 |
| 2,205,823 | Rice | June 25, 1940 |
| 2,215,631 | Young | Sept. 24, 1940 |
| 2,341,866 | Higgins | Feb. 15, 1944 |
| 2,243,306 | Ashton | May 27, 1941 |
| 1,619,504 | Gabriel | Mar. 1, 1927 |